United States Patent [19]

Nakagoshi et al.

[11] Patent Number: 5,379,451
[45] Date of Patent: Jan. 3, 1995

[54] MOBILE COMMUNICATION SYSTEM AND LOCATION REGISTRATION METHOD IN MOBILE COMMUNICATION SYSTEM

[75] Inventors: Arata Nakagoshi, Kokubunji; Hideya Suzuki, Hachioji; Yoshinobu Yamamoto, Fujisawa; Isao Shimbo; Tsuneo Furuya, both of Yokohama; Hiroshi Kuwahara, Kodaira, all of Japan

[73] Assignees: Hitachi, Ltd.; Kokusai Electric Co., Ltd., both of Tokyo, Japan

[21] Appl. No.: 972,547

[22] Filed: Nov. 6, 1992

[30] Foreign Application Priority Data

Nov. 8, 1991 [JP] Japan .................................. 3-292689

[51] Int. Cl.⁶ .............................................. H04B 7/00
[52] U.S. Cl. .................................. 455/54.2; 455/54.1; 455/56.1; 455/33.1; 379/59
[58] Field of Search ............... 455/54.2, 56.1, 54.1, 455/33.1, 52.1, 50.1, 63, 33.2, 33.4, 9, 226.1, 226.2; 379/59, 60, 58, 63

[56] References Cited

U.S. PATENT DOCUMENTS

| | | | |
|---|---|---|---|
| 4,359,712 | 11/1982 | Matsumura | 455/54.2 |
| 4,887,265 | 12/1989 | Felix | 455/54.2 |
| 5,020,091 | 5/1991 | Kralopp et al. | 379/59 |

FOREIGN PATENT DOCUMENTS

| | | |
|---|---|---|
| 0295678 | 12/1988 | European Pat. Off. |
| 0536544 | 4/1993 | European Pat. Off. |
| 0050533 | 2/1990 | Japan ............... 455/33.1 |
| 0244917 | 9/1990 | Japan ............... 455/33.1 |
| 3092023 | 4/1991 | Japan . |
| 0104330 | 5/1991 | Japan ............... 455/33.1 |
| 0166828 | 7/1991 | Japan ............... 455/33.1 |
| 0276929 | 12/1991 | Japan ............... 455/56.1 |
| 4373329 | 12/1992 | Japan . |

OTHER PUBLICATIONS

Masaaki Shinshi, "Mobile Communication", 1989, Sep. pp. 171-172, 244-246.

*Primary Examiner*—Curtis Kuntz
*Assistant Examiner*—Nguyen Vo
*Attorney, Agent, or Firm*—Antonelli, Terry, Stout & Kraus

[57] ABSTRACT

A mobile station, operable in a mobil communication system that executes a location registration processing by using the channel quality of a base station and an information concerning a base station the mobile station includes a base station information memory unit for storing therein information concerning a plurality of base stations and an amount in which the channel quality of the base station is changed with time and a location judging unit for judging on the basis of the amount in which the base station information is changed with time and which is stored in the base station information memory unit whether or not location registration processing is to be executed indicating a location in service area. Whether the location registration processing is to be executed or not is determined in accordance with the moving speed of the mobile station, thereby limiting the occurrence of a location registration request which becomes invalid with a large possibility in a short period of time because the mobile station moves to another location registration area or to the calling area in a short period of time.

4 Claims, 4 Drawing Sheets

FIG. I

PRIOR ART

FIG. 2

PRIOR ART

MOBILE COMMUNICATION SYSTEM AND LOCATION REGISTRATION METHOD IN MOBILE COMMUNICATION SYSTEM

BACKGROUND OF THE INVENTION

1. Field of the Invention

The present invention relates to a mobile communication system and a method of controlling a location registration processing in the mobile communication system and, more particularly, is directed to a mobile communication system in which the service area is composed of small radio zones and directed to a mobile communication system supposed to use at low speed or in stationary conditions, such as a portable radio telephone system in which a location registration processing of a mobile telephone system is required.

2. Description of the Prior Art

In conventional mobile communication systems such as a mobile telephone or the like in which a plurality of zones are combined to constitute a service area, in order to reduce unnecessary calls when a mobile station receives a call from a base station, there is adopted such a system in which a plurality of calling areas, each composed of a plurality of zones, are provided within the service area and a mobile station is accessed from a base station located within a calling area whose location is registered.

In general, when a mobile station is powered or enters the service area from the outside of the service area, a location registration processing is carried out. A book that had been edited by Masaaki Shinshi and published on September 1989 under the title of "Mobile Communication", for example, describes these location registration systems.

As an example of the location registration system, there are known a system in which a base station receives a signal from a mobile station and the base station or a radio exchange station judges the mobile station's location in the service area and a system in which the mobile station receives a signal from the base station to judge its own location in the service area.

Figure 1:
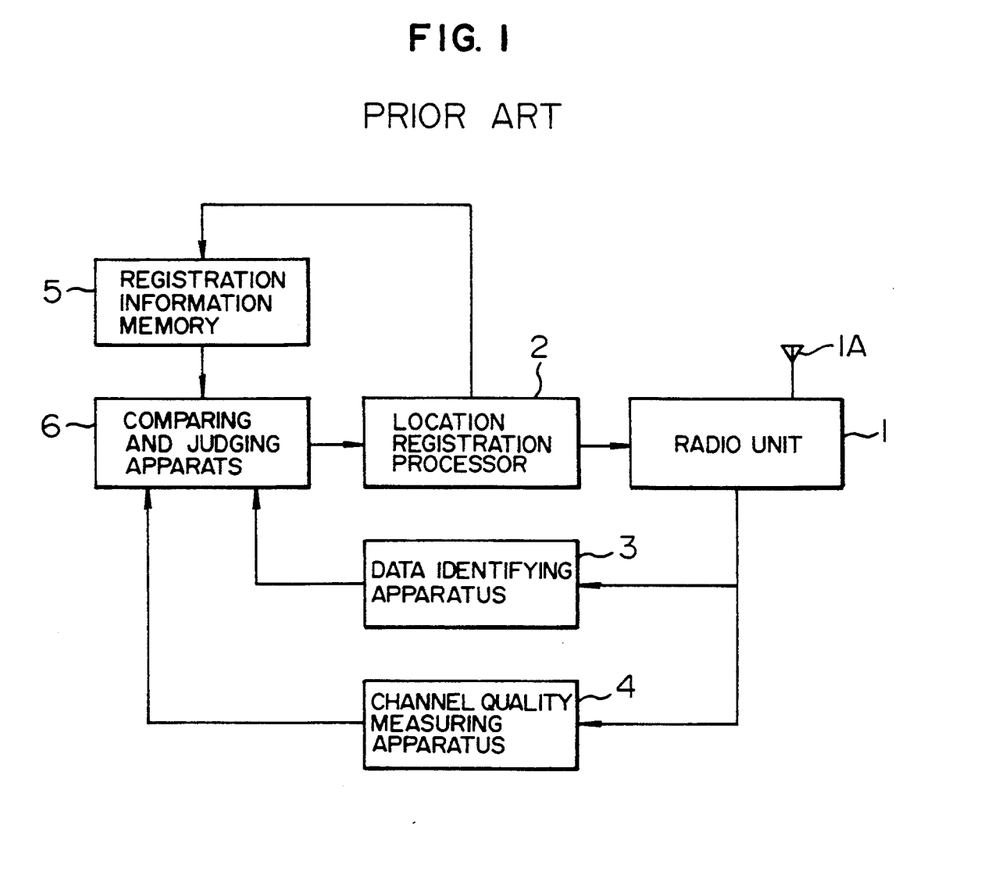
FIG. 1 is a functional block diagram showing an example of a location registration processing unit according to the prior art.

FIG. 1 of the accompanying drawings shows in functional block form an example of the conventional location registration system in which the mobile station judges its own location in service area.

As shown in FIG. 1, the conventional mobile station includes a radio unit 1 for effecting the transmission or reception between it and the base station (not shown) via a radio signal through an antenna 1A, a channel quality measuring apparatus 4 for receiving a received signal (control signal) from the base station to evaluate the channel quality, a data identifying apparatus 3 for identifying from a received signal a calling area name (described later on) or a location registration area name (described latex on) and a base station name (i.e., an ID (identification) code of the base station) or a zone name (ID code when zones are composed of a plurality of base stations), a registration information memory 5 for storing therein a location registration information that was already registered, a comparing and judging apparatus 6 for comparing an information concerning the base station having a best channel quality from the channel quality measuring apparatus 4 and the data identifying apparatus 3 with the content of the registered location registration information stored in the registration information memory 5 and a location registration processor 2.

In the above description, the calling represents operation such that, a plurality of zones are grouped and, a plurality of base stations in the same group call a particular mobile station at the same time according to some suitable methods, such as a TDMA (time division multiple access) method or the like. Further, the calling area names represent ID code of groups of a plurality of zones (or base stations). The location registration area name is as follows. In general, since the service area is composed of a plurality of calling areas, when calling a particular mobile station, requiring information of present location of each mobile station. The location registration is the operation of registering a present location of each mobile and, the location registration area is composed of a plurality of zones (or base stations). The location registration area names represent the ID code representing these groups of a plurality of zones. Sometimes the calling areas are the same the location registration areas.

A location registration processing of the conventional system shown in FIG. 1 will hereinafter be described with reference to a flowchart in FIG. 2.

Figure 2:
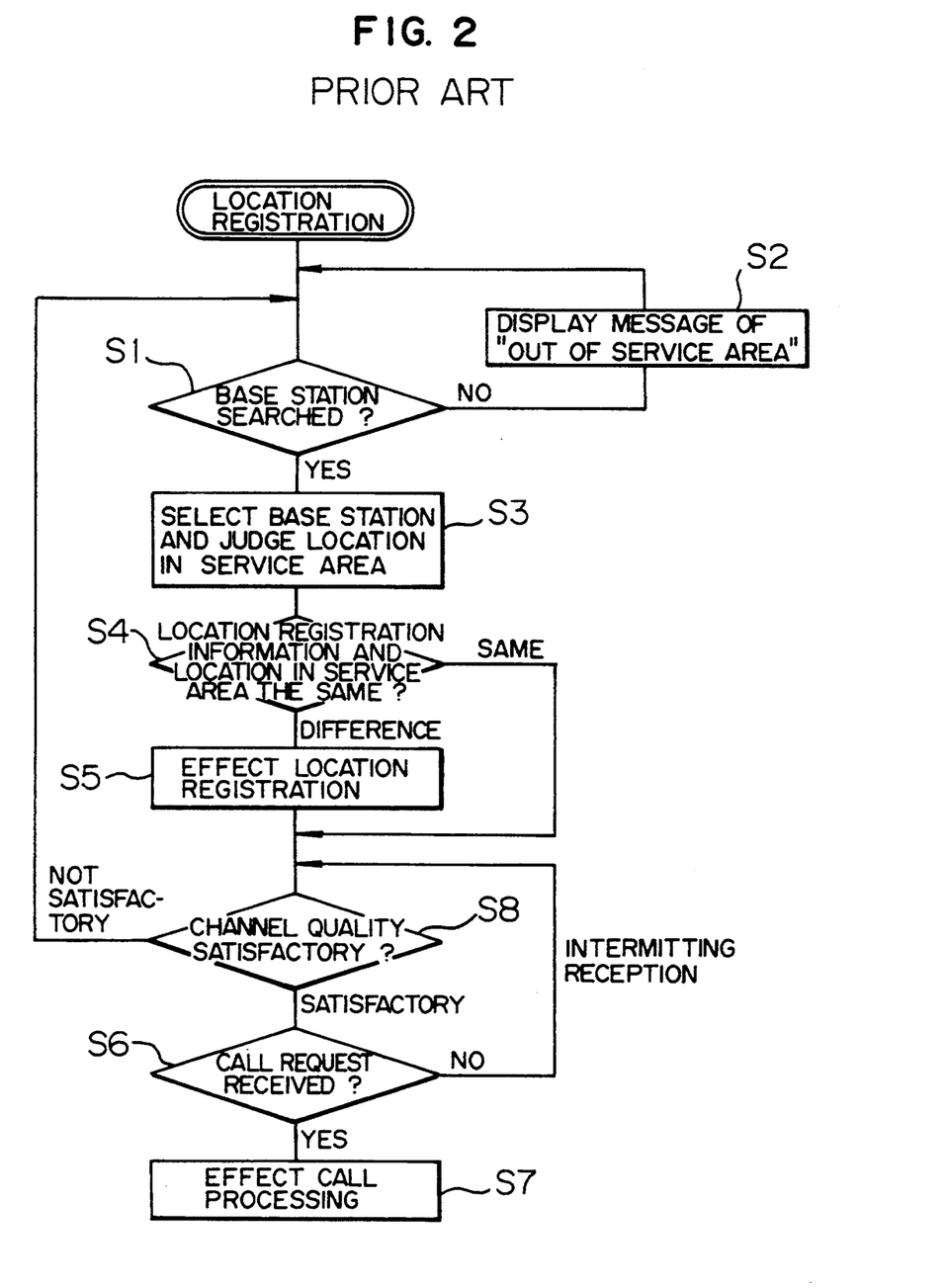
FIG. 2 is a flowchart to which references will be made in explaining the conventional location registration processing.

As shown in FIG. 2 of the accompanying drawings, when the mobile station executes the location registration processing, in decision step S1, the mobile station receives a signal of a frequency band that was allocated in advance and searches a base station that the mobile station can communicate with. In decision step S1, the base station that can be communicated with the mobile station is retrieved by the channel quality measuring apparatus 4 and the data identifying apparatus 3. If the base station that can be communicated with the mobile station is not searched as represented by a NO at decision step S1 because the level of the received signal is low or the like, then the processing proceeds to step S2, whereat a message representative of "out of service area" is displayed. Then, the processing returns to decision step S1, whereat the base station is searched at a preset time interval. If the base station that can be communicated with the mobile station is searched as represented by a YES at decision step S1, then the processing proceeds to step S3, whereat the data identifying apparatus 3 reads out the location registration area name or the calling area name, the base station name or the zone name from the received signal and the channel quality measuring apparatus 4 evaluates the channel quality between the base station and the mobile station on the basis of a received electric power or error rate of received data. Then, a base station whose channel quality is regarded to be best is selected from a plurality of base stations that can be communicated with the mobile station by the comparison of a received electric power, an error rate of received data or the like, and the location in service area is judged on the basis of an information concerning the base station thus selected.

Then, the processing proceeds to the next step S4, whereat the last location registration information and the location in service area are compared with each other. If the location in service area is different from the last location registration information, then a signal is transmitted to the selected base station that can be communicated with the mobile station to thereby effect the location registration processing in step S5. The base station receives necessary information such as mobile station name or the like in response to the request of the mobile station and registers the same in a memory station that administers a location information of each mobile station.

Referring back to FIG. 1, the comparing and judging apparatus 6 judges optimum base station and location in service area, and compares the location in service area with the last location registration information stored in the registration information memory 5 to thereby determine whether or not the location registration is to be executed. After the location registration processing at step S5 was finished, the mobile station enters the intermitting reception state in order to reduce an amount of consumed electric power so that it may receive an information from the base station at a constant time interval to await the call from the base station. If the mobile station receives a call request from the base station as represented by a YES at decision step S6, then the mobile station executes the call processing at step S7. During the intermitting reception state, or if the call request is not received as represented by a NO at decision step S6, then the processing proceeds to decision step S8, whereat the evaluation of the channel quality is effected by the channel quality measuring apparatus 4. If it is determined in decision step S8 that the channel quality of the base station is not satisfactory or that the reception becomes difficult such as when the reception level of the base station is lowered due to the motion of the mobile station, then the processing returns to the decision step S1, whereat the base station that can be communicated with the mobile station is again searched. If the base station name or the zone name, the location registration area name or the calling area name is changed from a received signal of a new base station supplemented, then the location registration processing is executed one more time at step S5.

The location registration area or the calling area is generally constructed by the combination of a plurality of zones. Accordingly, if the location registration area or the calling area is not changed even though the base station that can be communicated with the mobile station is changed due to the motion of the mobile station or the like, the location registration processing need not be executed one more time.

In general, a moving speed of a mobile station is changed a lot in accordance with the situation under which the user of the mobile station is placed. If the user of the mobile station is in a high speed vehicle such as a train, a bus or the like, then a moving speed of the base station is increased about ten times or more as compared with the moving speed at which the user having the mobile station is walking. In order to call the mobile station, the location registration must be updated each time the location registration area or the calling area is changed in accordance with the motion of the mobile station. Therefore, during the mobile station is in motion at high speed, a frequency at which the location registration is updated is increased about 10 times or more as compared with a frequency at which the location registration is updated during the mobile station user is walking. That is, according to the conventional location registration system, the mobile station within the high speed vehicle must frequently effect the location registration so that a location registration control unit in a system having a number of mobile stations accommodated therein suffers from an increased burden.

Further, there is the large possibility that, even when the base station sends a call request to the mobile station located within the high speed vehicle on the basis of the location registration information, the mobile station cannot answer the call request from the base station because the mobile station is moved to another calling area or to the outside of the service area and also the location registration information is not yet registered again, which as a result increases a blocking probability. In order to reduce a blocking probability, it is proposed to set a wide calling area. Alternatively, there is proposed a method such that, when the mobile station cannot answer the call request from the base station in the calling area whose location is registered, a call request is executed by the calling area of the surroundings. If these methods are realized, then the mobile communication system unavoidably suffers from an increased burden with respect to the location registration processing and the call processing from a system control standpoint.

If the location registration processing, frequently executed by the mobile station that is in motion at high speed., is controlled from a services standpoint, then an amount in which a burden imposed upon the system is increased due to the concentration of a lot of unnecessary location registration requests can be alleviated or the system can be simplified. Further, if the occurrence of the unnecessary location registration requests is alleviated, then a frequency at which the mobile station effects the transmission for location registration processing can-be reduced and the amount of the electric power consumption of the mobile station can be reduced effectively.

To restrict the location registration processing executed by the mobile station that is in motion at high speed, the moving speed of the mobile station must be understood. In on-vehicle radio transmitter and receivers, typically represented by the mobile telephone system, the moving speed of the mobile station can be constantly measured by utilizing a speedometer. However, it is difficult to measure the moving speed of the mobile station while the user of the mobile station is on the high speed vehicle such as a bus or the like.

SUMMARY OF THE INVENTION

Therefore, it is an object of the present invention to provide an improved portable radio telephone system in which the aforesaid shortcomings and disadvantages of the prior art can be eliminated.

More specifically, it is an object of the present invention to provide a portable radio telephone system in which a moving speed of a mobile station can be understood and in which a location registration from a mobile station that is in motion at high speed can be self-controlled.

Another object of the present invention is to provide a portable radio telephone system which can alleviate an increased burden imposed upon the system due to a concentration of a number of location registration requests.

A further object of the present invention is to provide a portable radio telephone system in which a traffic of a location registration request can be lowered.

Yet a further object of the present invention is to provide a portable radio telephone system in which a frequency at which location registration requests are collided can be lowered.

Still a further object of the present invention is to provide a portable radio telephone system in which an amount of an unnecessary electric power consumption of a mobile station can be reduced.

In order to achieve the above-mentioned objects, the present invention makes effective use of a received signal from a base station as a standard of judgement for judging a moving speed of a mobile station and also a channel quality based on a received electric power or an error rate of received data. Received signals from a plurality of base stations are measured a plurality of times by utilizing a channel quality evaluating apparatus that was already-installed on the conventional mobile station. At the same time, information concerning respective base stations, such as a location registration area name or the like, are identified. The portable radio telephone system of the present invention includes a base station information memory that stores therein the above measured results and identified results. Further, the portable radio telephone system of the present invention includes a location judging apparatus which judges the location in the service area of the mobile station and which also judges on the basis of the condition under which measured data is fluctuated with time whether or not the location registration processing is to be executed. Thus, it is possible to alleviate the occurrence of the location registration requests from the mobile station that is in motion at high speed.

Situation of a radio wave propagation is changed momentarily in accordance with the motion of the mobile station or the fluctuation of the situation of the surroundings. If the mobile station evaluates the amount in which the channel qualities of a plurality of base stations are fluctuated with time, then the moving speed of the mobile station itself can be understood qualitatively. The present invention employs a received electric power as a first evaluation standard. Received electric powers from a plurality of base stations and which can be evaluated by the mobile station are changed in response to a physical distance between the mobile station and the base stations. Study of a received signal from a single base station reveals that the received electric power is changed with time while the mobile station is in motion. In other words, if the mobile station is in a stationary state or in motion at low speed, then an amount in which the received electric power is changed with time is reduced. If on the other hand the mobile station is on a high speed vehicle, then the amount in which the received electric power is changed with time is increased. According to the present invention, a plurality of base stations that can be communicated with the mobile station are supplemented and a base station name, a location registration area name or a calling area name and a received electric power are read out from the received signal and then stored. If this operation is repeatedly carried out a plurality of times at a preset time interval, then it is possible to understand the situation under which the information concerning the base station is changed with time. Then, it is determined on the basis of the information thus stored whether or not the location registration processing is to be executed. Fundamentally, if the fluctuation of the received electric power is small, then the location registration processing is effected. Conversely, if the fluctuation of the received electric power is large, then the location registration processing is inhibited. The mobile station name, the registration area name, the calling area name, etc., are identified by a so-called ID (identification) code or the like.

It is frequently observed that a communication is affected by a radio interference although the level of the received electric power is high. In that case, even though a necessary information such as the base station name or the like is obtained, superiority or inferiority of the channel quality of the base station cannot be judged indiscriminately on the basis of only the magnitude of the received electric power. Therefore, the present invention employs an error rate of received data as a second standard of evaluating the channel quality. By evaluating the error rate of received data by verifying a data pattern with a preset data pattern, the channel situation upon radio interference can be grasped and the change of the error rate of received data can be used as the standard to determine whether or not the location registration processing is to be executed. Further, if the received electric power and the error rate of received data are combined to provide a new standard by which the channel quality of the base station is evaluated, then it becomes possible to obtain a more detailed information concerning the receiving situation of the mobile station and the base stations located on the surroundings, such as the existence of the radio interference or the like.

If it is determined by the above-mentioned processing that the location registration processing is executed, then the processings which follow are similar to those of the prior-art example. A base station whose channel quality is regarded as the best by the mobile station is selected from a plurality of base stations that can be communicated with the mobile station and the processing concerning the location registration is executed. If the location registration area name or the calling area name of the same content was already registered, then the location registration processing need not be executed. In this case, similarly to the example of the prior art, the location registration processing can be omitted and the mobile station enters the intermitting receiving condition under which the base station whose channel quality is evaluated to be the best is employed as a target base station.

If it is determined on the basis of the evaluated result of the moving speed of the mobile station that the location registration processing is not effected although it is clearly identified on the basis of the evaluated result of the channel quality that the mobile station is located within the service area, this situation is different from the situation in which the mobile station is located out of service area. Therefore, a message representative of "not registered" or the like is displayed and the retrieval of base station is again executed at a preset time interval.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 3:
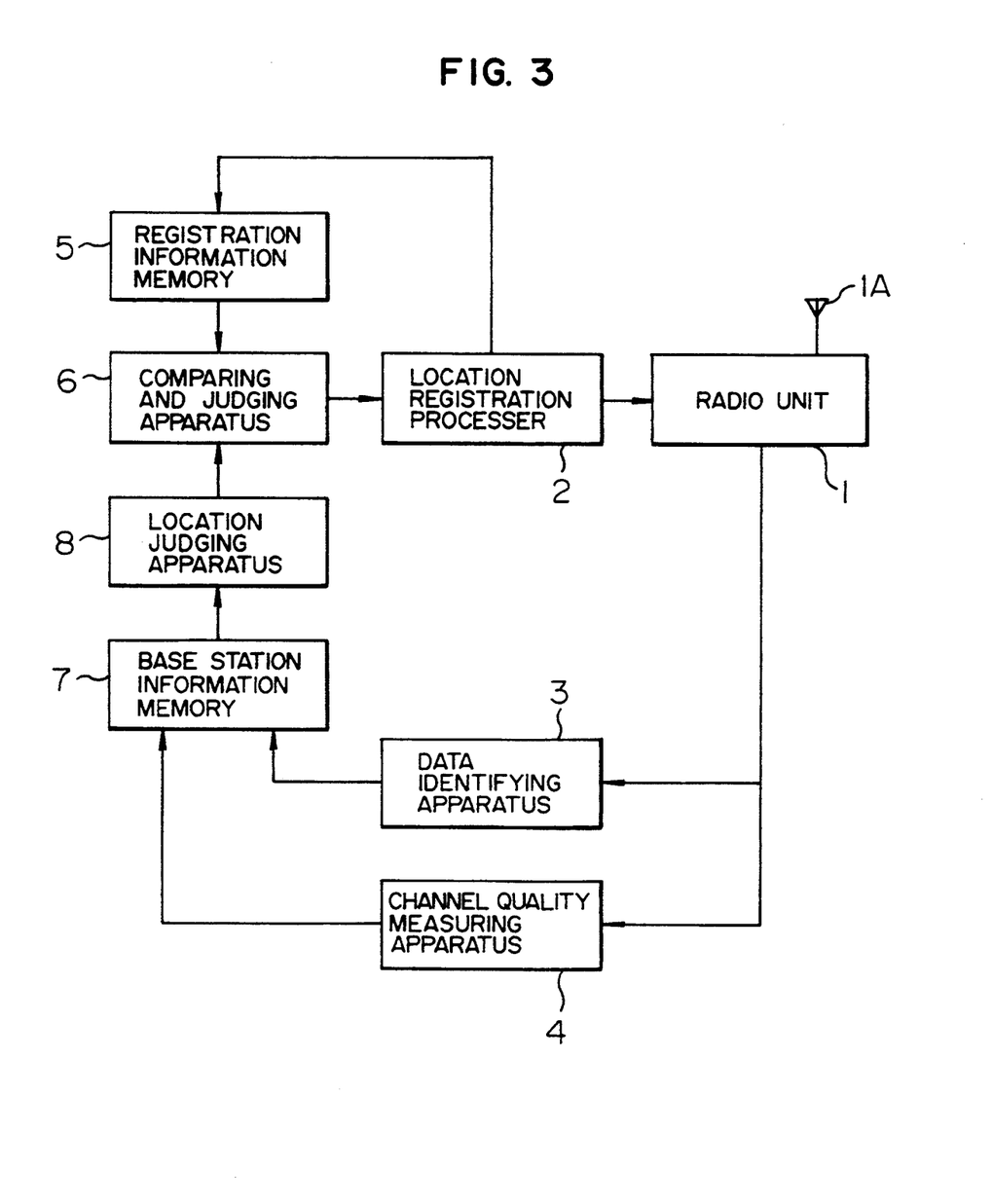
FIG. 3 is a functional block diagram showing a location registration processing unit in the present invention.

Embodiments of the present invention will be described hereinafter with reference to the drawings. FIG. 3 of the accompanying drawings shows a functional block diagram of a mobile station that can be applied to a mobile communication system according to the present invention. In FIG. 3, elements and parts identical to those of FIG. 1 are marked with the same references and therefore need not be described in detail.

As shown in FIG. 3, the mobile station comprises the radio unit 1 for effecting the transmission and reception between it and a base station via a radio signal through an antenna 1A, the channel quality, measuring apparatus 4 for receiving a received signal from the base station to thereby evaluate the channel quality of the base station, the data identifying apparatus 3 for obtaining the calling area name or the location registration area name and the base station name or the zone name from the received signal, a base station information memory 7 for storing therein a base station information obtained in the channel quality measuring apparatus 4 and the data identifying apparatus 3, a location judging apparatus 8 for determining on the basis of the condition under which the base station information stored in the registration information memory 7 is changed with time whether or not the location registration is executed and for judging the location in service area, the registration information memory 5 for storing therein the registered location registration information, the comparing and judging apparatus 6 for comparing the base station information obtained in the location judging apparatus 8 with the content of the registered location registration information stored in the registration information memory 5 and the location registration processor 2.

A signal from the base station (not shown) is received by the radio unit 1 through the antenna 1A. Then, the received signal is supplied to the data identifying apparatus 3 and the channel quality measuring apparatus 4 from which there are derived an information concerning the retrieval of base stations that can be communicated with the mobile station and information concerning the respective base stations, respectively. Of the base stations that can be communicated with the mobile station, base stations of a predetermined number are listed up in the sequential order of better channel quality and then stored in the base station information memory 7 together with the information concerning each base station as a base station information list. The retrieval of the base station is executed a plurality of times (n times) at every preset time interval, whereby n base station information lists are stored in the base station information memory 7. The location judging apparatus 8 analyzes the base station information lists stored in the base station memory 7 to thereby determine whether the location registration processing is executed or not. If the mobile station is in a stationary state, then the channel quality of the base station whose channel quality is regarded to be better becomes constant from a time standpoint and only the channel quality of the base station having the channel quality of low order is changed in accordance with the situation of the surroundings from a time standpoint.

However, when the mobile station is located near the boundary between the zones, there is then the possibility that the order of the channel quality of the mobile station will be changed with time. If the mobile station is in motion, the base station names, which were stored in the base station information list in the sequential order of the channel quality, or the zone names are fluctuated with time. If the moving speed of the mobile station is low, then they are fluctuated gently. If on the other hand the moving speed of the mobile station is high, then they are fluctuated rapidly. Accordingly, by analyzing the state under which the content of the base station information list stored in the base station information memory 7 is changed with time, it is possible to understand the moving speed of the mobile station qualitatively. An object of the present invention is to restrict the location registration in the case such that the mobile station or the user of mobile station is in motion at high speed and passes the zone in a short period of time. Accordingly, in order to determine on the basis of the qualitative understanding of the moving speed of the mobile station whether or not the location registration processing is to be executed, considering the size of the zone or calling area and an upper limit value of the moving speed of the mobile station that is desired to execute the location registration processing, it becomes necessary to set a standard of judgement by which the time interval for the base station retrieval is determined. Also, it becomes possible to determine whether or not the location registration processing is to be executed.

As a method of understanding the moving speed of the mobile station qualitatively as described above, the present invention employs a method in which signals from a plurality of base stations are received and the conditions that channel qualities of the respective base stations are changed with time are analyzed. As a standard for evaluating the channel quality of the mobile station, there is generally utilized a received electric power because the received electric power can be measured comparatively easily. Therefore, a number of mobile stations having a received electric power measuring unit are already commercially available on the market. The received electric power in the mobile station or in the base station is changed in accordance with a distance between the base station and the mobile station so that, if the mobile station is in a stationary state or in motion at low speed, then the fluctuation of the received electric power is reduced. If on the other hand the mobile station is on the high speed vehicle, then the fluctuation of the received electric power is increased depending upon the conditions such as the moving direction of the mobile station or the like. In the mobile communication system in which the transmission electric power is comparatively small and a distance in which the base station and the mobile station can communicate with each other is short, a time during which the base station and the mobile station can continuously communicate with each other is reduced with the increase of the moving speed of the mobile station. Strictly, the received electric power is fluctuated a lot depending upon the situation of the surroundings such as a fading or the like and the moving direction of the mobile station is changed frequently. Therefore, the received electric power must be averaged in a range sufficient so that these influences can be absorbed and that the moving speed of the base station can be understood without trouble.

According to the present invention, a plurality of base stations that can receive a signal from the mobile station are captured, the base station name, the location registration area name or the calling area name is read out from the received signal, the received electric power is ranked as the channel quality and then stored in the base station information memory 7. The processings which follow are the same as those described above with respect to the channel quality of the base station. By analyzing the conditions under which the base stations or zones, which were ranked in the sequential order of the level of the received electric power after the base stations were searched a plurality of times at a preset time interval, are changed with time, the moving speed of the mobile station is understood qualitatively and also it is determined whether or not the location registration processing is to be executed. If the amount in which the base station information stored in the base station information memory 7 is changed with time is small, then the location registration processing is executed. Whereas, if the amount in which the base station information is changed with time is large, the location registration processing is inhibited. Therefore, it becomes possible to reduce the occurrence of the aforementioned unnecessary location registration request. Further, since the location registration request from the mobile station that is in motion at high speed can be restricted, a traffic in the location registration request can be lowered. Consequently, a frequency at which the location registration requests are collided can be lowered and a ratio with which the location registration requests from the mobile station that is in a stationary state or in motion at low speed are successfully effected can be increased.

Another embodiment of the present invention will be described below as a standard of evaluating the channel quality of the base station. It is frequently observed that a desired receiving wave of a base station that is to be received is disturbed by an interference wave from other base station or mobile station due to a radio interference or the like. In that case, if the electric power of the interference wave is high, then the received electric power of the desired wave cannot be understood precisely. Therefore, a mobile station whose channel condition is not always satisfactory because of the radio interference applied thereto although the received electric power is high must be evaluated properly. It is of course out of question that a necessary information such as the location registration area name or the like cannot be read out although the level of the received electric power is sufficiently high. This situation ought to be detected during the channel quality of the base station is evaluated by the received electric power. In order to understand the situation of the channel upon radio interference, the base station transmits a preset data pattern and the mobile station measures an error rate of received data with respect to this data pattern. Instead of the received electric power, the change of the error rate of received data is employed as a standard of judgement by which it is determined whether or not the location registration processing is to be executed. If a combination of the received electric power and the error rate of received data is employed as a standard of judgement to determine whether or not the location registration processing is to be executed, then it becomes possible to obtain a more detailed information on the mobile station and the receiving situation from the base station of the surroundings.

Figure 4:
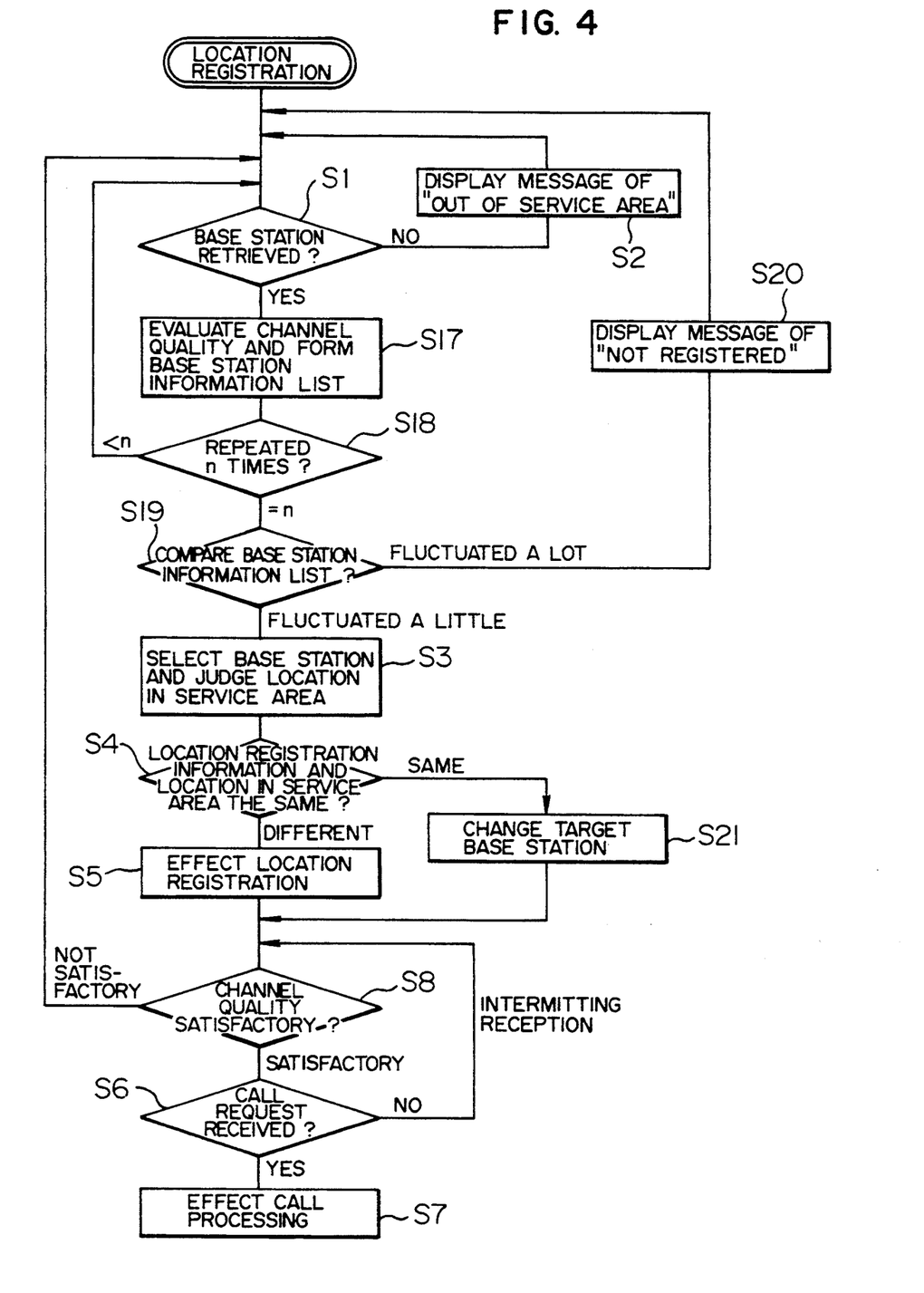
FIG. 4 is a flowchart to which references will be made in explaining a location registration processing according to the present invention.

FIG. 4 of the accompanying drawings shows a flowchart to which references will be made in explaining the above-mentioned procedure. The location registration procedure is fundamentally based on the conventional system that was already explained with reference to the flowchart forming FIG. 2. Therefore, like steps and processings corresponding to those of FIG. 2 need not be described in detail and steps added thereto according to the present invention will be described mainly.

Referring to FIG. 4, before the location in service area is judged, at decision step S1, the base station is retrieved a plurality of times at every predetermined time interval. In the flowchart shown in FIG. 4, at decision step S1, the base station is repeatedly searched n times, for example. If the base station is searched as represented by a YES at decision step S1, then the processing proceeds to step S17, whereat the channel quality (the received electric power and/or the error rate of received data) of the base station is evaluated n times and a base station information list such as a base station name and a location registration area concerning m base stations whose channel qualities are evaluated to be better in each evaluation is formed. If this processing is repeated n times, then data concerning m×n data concerning m base stations can be obtained in total (m and n are both positive integers). In the next decision step S18, it is determined whether or not the step S17 is repeated n times. If it is determined in decision step S18 that the step S17 is repeated n times, then the processing proceeds to the next decision step S19. If not, then the processing returns to step S1.

After data were collected and the base station information lists were made, in the decision step S19, the base station information lists are compared. If it is determined by the comparison in step S19 that the base station name and the location registration area that can be received are changed in a short period of time, then it can be assumed that the mobile station is moved at very high speed. In that case, the location registration processing is not executed and the processing proceeds to step S20, whereat a message representative of "not registered" is displayed. Thereafter, the processing proceeds to the initial mode. After a pause of a predetermined time, the search of base station is resumed at step S1. It is important for the user of mobile station to understand whether or not the location registration processing is correctly executed at the location in service area within the service area. The present invention intends to suppress the occurrence of location registration request that is made by the mobile station that is in motion at high speed within the service area. Therefore, it is very significant for the user of mobile station to know a message representative of "not registered" when it is determined on the basis of the result of the list comparison in decision step S19 that the location registration processing is not executed.

If on the other hand the information concerning the base station is changed a little with time, then it can be assumed that the moving speed of the mobile station is low so that the mobile station remains within the present location registration area or the calling area during a relatively long period of time. In that case, the processing proceeds to the next step of the location registration processing. There may be considered a wide variety of methods by which a degree at which the base station name and the location registration area are fluctuated is determined in step S19. By way of example, the location registration processing might be continued if the same base station (or the same calling area) whose received electric power is highest in level is determined continuously n times. A standard of judgement must be examined on the basis of the system specification such as a calling system or the like.

If it is determined on the basis of the judged result of the list verification in step S19 that the location registration processing is continued, then a base station to which the location registration request is issued is selected and the processing proceeds to step S3, whereat the location in service area is judged. As a simple method of judging the location in service area, there may be considered a method in which a base station having a best channel quality is selected from the base station information list collected last and a location (i.e., location registration area or the calling area) to which the selected base station belongs is adopted as the location in service area of the mobile station. As a more complex method of judging the location in service area, there may be considered a method in which the future change of the base station information is predicted on the basis of the change of the base station information from a time standpoint to thereby determine the location in service area and the base station that can be communicated with the mobile station. Then, the content of the present processing is compared with that of the processing in the last location registration processing. That is, the processing proceeds to the next decision step S4, whereat the location registration information and the location in service are compared with each other. If it is determined in decision step S4 that the location in service area is changed, then the processing proceeds to step S5, wherein the location registration processing is executed. Thereafter, the mobile station enters the intermitting receiving state and awaits the call request. If on the other hand it is determined in decision step S4 that the location in service area judged this time is the same as the location registered last, then the location registration processing need not be executed. Accordingly, in that case, the processing proceeds to step S21, whereat the selected base station is changed to a target base station with which the mobile station is to communicate during the intermitting receiving state, whereafter the mobile station enters the intermitting receiving state. The intermitting receiving system and a method of releasing the intermitting receiving state are similar to those of the prior art example and therefore need not be described herein.

In some cases, the mobile station users have to execute the location registration processing in a short period of time so that they can become ready for the call request. To meet with such requirements of the mobile station users, it has been proposed so far to take an automatic mode where the location registration processing shown in FIG. 1, for example, is automatically executed at the predetermined time interval together with a manual mode where the location registration processing is activated in a manual fashion. When the location registration processing is executed in a manual fashion, as shown in FIG. 4, the base station is searched once (n=1) in step S18 and the list comparison in decision step S19 and the comparison of the location in service area in decision step S4 are omitted, whereby the location registration processing can be executed reliably in a short period of time. In addition, the manual location registration can be set by modifying the number at which the base station information list is formed repeatedly in step S18 and also the time interval during which the base station is searched repeatedly, etc.

According to the present invention, since whether or not the location registration processing is executed is determined in accordance with the moving speed of the mobile station, it is possible to restrict the occurrence of the location registration request which becomes invalid in a short period of time because the mobile station is moved to other location registration area or to the calling area in a short period of time. Thus, the traffic of the location registration request can be lowered. Consequently, the frequency at which the location registration requests are colliding can be lowered. Also, the ratio at which the location registration request from the mobile station that is in a stationary state or in motion at low speed successfully becomes valid can be increased. Furthermore, since the frequency of the location registration request is lowered, the amount of the unnecessary electric power consumption of the mobile station can be reduced.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A portable radio telephone suitable for a portable radio telephone system composed of a plurality of base stations forming a plurality of zones adjacent to each other in a service area, each of said base stations communicating via a plurality of radio channels with a plurality of portable radio telephones each moving in the service area, comprising:

a radio unit, having an antenna, for receiving control signals, each control signal includes an identification code of a base station that transmitted the control signal, from said plurality of base stations at a predetermined cycle via said antenna and for transmitting a location registration signal issued from the portable radio telephone to one of said plurality of base stations via said antenna to request registration of location information of the portable radio telephone at a memory unit for a call control;

means coupled to said radio unit for repeatedly measuring channel quality of said radio channels between the portable radio telephone and said plurality of base stations based on said control signals received by said radio unit and for producing a base station information list every measuring cycle, said base station information list including identification codes of a predetermined number of base stations selected among said plurality of base stations based on a result of the measured channel quality, said identification codes being arranged in sequential order of base stations having better channel quality;

a memory unit for storing a set of said base station information lists obtained through a predetermined number of measuring cycles; and a judging unit for judging a location of the portable radio telephone in said service area and for determining whether said location registration signal is to be transmitted or not by referring to said memory unit when said set of said base station information lists are prepared in said memory unit so that, if the order of said identification codes varies with each of said set of said base station information lists above a predetermined extent, then the transmission of the location registration signal is inhibited regardless of the location of the portable radio telephone.

2. A portable radio telephone according to claim 1, wherein said channel quality is measured in accordance with a power intensity of each of said control signals received from each of said plurality of base stations.

3. A portable radio telephone according to claim 1, wherein said channel quality is measured in accordance with an error rate of each of said control signals received from each of said plurality of base stations.

4. A portable radio telephone according to claim 1, wherein said portable radio telephone further comprises means for indicating that a location registration function is restricted when said location registration signal is inhibited from issuing.

* * * * *